United States Patent [19]

Izumi

[11] 4,441,815
[45] Apr. 10, 1984

[54] SELF-MODULATING SPECTROMETER

[75] Inventor: Takusuke Izumi, Tokyo, Japan

[73] Assignee: Anritsu Electric Company Limited, Tokyo, Japan

[21] Appl. No.: 296,735

[22] Filed: Aug. 27, 1981

[30] Foreign Application Priority Data

Mar. 31, 1981 [JP] Japan .................................. 56-46263

[51] Int. Cl.³ ............................................... G01J 3/42
[52] U.S. Cl. ..................................... 356/328; 250/373
[58] Field of Search .................. 356/51, 326, 328–330, 356/332, 334, 319, 320, 323–325; 250/373

[56] References Cited

FOREIGN PATENT DOCUMENTS 55-42035  3/1980  Japan .................................. 250/373

OTHER PUBLICATIONS

Izumi et al., *Analytical Chemistry*, vol. 53, No. 6, May 1981, pp. 782–786.

*Primary Examiner*—F. L. Evans
*Attorney, Agent, or Firm*—Jordan and Hamburg

[57] ABSTRACT

A wavelength-modulated derivative spectrometer is disclosed which enables continuous measurement of trace amounts of $NH_3$ in stack gas which includes a high concentration of $SO_2$, and which in general enables measurement of low amounts of a substance having a relatively broad-band absorption spectrum present in a gas together with a high concentration of a substance having a relatively narrow-band periodic spectrum structure, with interference resulting from the latter substance being substantially eliminated.

20 Claims, 10 Drawing Figures

SELF-MODULATING SPECTROMETER

BACKGROUND OF THE INVENTION

The present invention relates in general to spectroscopic analysis of very low concentration of a substance having a known characteristic absorption spectrum in the presence of other substances having absorption spectra which overlap that of the substance to be measured. More particularly, the present invention is directed toward a wavelength-modulated derivative spectrometer for spectroscopic measurement of the concentration of a gas or vapor in the presence of another gas or vapor which has an absorption spectrum with a periodic structure such that the maxima and minima of this periodic structure are relatively narrow by comparison with maxima or minima of the absorption spectrum of the substance to be measured, so that the spectrum of the substance having a periodic spectral structure tends to overlap the spectrum of the substance to be measured and thereby interfere with such measurements. Such a situation is typified by the measurement of trace amounts of ammonia ($NH_3$) in stack gas from an oil-fired furnace, such stack gas containing a relatively high concentration of sulfur dioxide ($SO_2$).

Derivative spectrometry based on wavelength modulation is an extremely sensitive method of spectroscopic analysis, which has been described in various patent applications and scientific papers, for example in Japanese Pat. No. 033095, 1976, and in the Journal of physics E : Scientific instruments, Vol. 14, 1981, pp. 105 to 112 (published in the United Kingdom). Such prior art types of wavelength-modulated derivative spectrometer have been proved effective in the measurement of a spectrum having a relatively fine structure in the presence of an interfering substance having a relatively broad spectral structure. However such prior art wavelength-modulated derivative spectrometers cannot measure small concentrations of a substance having relatively broad spectral characteristics in the presence of a substance a periodic spectrum structure having more finely detailed spectral characteristics (i.e. having more sharply curved spectral maxima and minima). For this reason, such wavelength-modulated derivative spectrometers of the prior art cannot be used, for example, to measure low concentrations of ammonia in the presence of large amounts of sulfur dioxide, since the spectral characteristics of the sulfur dioxide produce a large amount of interference. There is at present a requirement for an accurate and reliable means for continuous measurement of ammonia concentration in the stack gas from various types of plant, e.g. from nitrogen oxide purging plant used with LPG, coal, or oil-fired plant, which has not hitherto been met in a simple and effective manner. Satisfactory means for meeting the above requirements are disclosed by the present invention, as will be described hereinafter with reference to specific embodiments.

SUMMARY OF THE INVENTION

The present invention comprises a wavelength modulation type of derivative spectrometer having a combination of features whereby interference from the spectrum of a substance having a relatively finely structured periodic absorption spectrum can be substantially eliminated in order to enable measurement of small concentrations of a substance having a relatively broad structure absorption spectrum which is combined with the interfering substance. The terms "finely structured" and "broad structure" will be clarified hereinafter with reference to the drawings, but in essence a finely structured spectrum is one which, when displayed as a graph of light intensity with respect to spectral wavelength, displays minima and maxima which are sharply curved. A broad structure spectrum, on the other hand, possesses at least one minimum or maximum on such a graph which is less sharply curved than those of the finely structured spectrum. In the wavelength-modulated derivative spectrometry method of spectroscopic chemical analysis, modulation of a light beam passing over the optical path within a spectroscope is performed by, for example, mechanically vibrating the dispersion device (e.g. a diffraction grating) or, as in the preferred embodiments of the present invention, by vibrating a plate which contains an exit slit of the spectrometer. The position of this exit slit determines the wavelength of light which is measured by the spectrometer, i.e. a part of the range of light wavelengths separated from one another by the dispersion means is selected by being passed through the exit slit and impinging upon a photoelectric detection device. If the central wavelength of the wavelength modulation is close to a spectral minimum or maximum wavelength, then a light intensity-modulated electrical signal which is produced by the photoelectric detection device in response to the light passing through the exit slit will have a frequency which is twice that of the wavelength modulation frequency, if the amplitude of this wavelength modulation is lower than a certain limit. In addition, the amplitude of this light intensity-modulated electrical signal will be determined only by the curvature of the spectrum at the selected measurement wavelength, and not by the absolute magnitude of the light intensity applied to the photoelectric detection device. Thus, this method provides a highly sensitive method of measuring the concentration of a substance having a sharply defined spectral maximum or minimum, since the amplitude of the light intensity-modulated electrical signal is proportional to the degree of curvature of the spectrum characteristic at the measurement wavelength, i.e. to the second derivative of the characteristic (hence the name "derivative spectrometer"). However when it is attempted to use this method to measure the concentration of a substance which is present in combination with some other substance whose spectrum has a periodic structure, with spectrum characteristics having a higher degree of curvature than those of the substance to be measured, then the spectral response caused by the substance having spectrum characteristics with a high degree of curvature will mask that of the substance to be measured. It is for this reason that it is not possible, with prior art wavelength-modulated derivative spectrometers, to measure small concentrations of ammonia in the presence of larger concentrations of sulfur dioxide.

In such prior art types of wavelength-modulated derivative spectrometers, it is usual to make the slit function (which is a mathematical function showing the characteristics in terms of a bandpass filter, and is determined by the dimensions of the exit and entrance slits in combination, and also by the characteristics of the dispersion device and the focal length of the spectroscope) as small as is practical, in order to attain maximum resolution of measurement. However it is a feature of the present invention that the slit function of the spectroscope is made relatively large by comparison with the period of the spectral characteristic of an interfering substance, e.g. sulfur dioxide, for example approximately equal to one period of the periodic spectrum of the interfering substance, or an integral multiple of one period. This results in substantially eliminating the amplitude of the periodic spectrum of the interfering substance, with respect to the light output from the exit slit of the spectroscope, i.e. the amplitude of the light intensity-modulated electrical signal component due to the periodic spectrum of the interfering substance is substantially eliminated.

It is another feature of the present invention that the amplitude of modulation applied to light passing through the spectroscope is made sufficiently high that the frequency of the light intensity-modulated electrical signal due to the periodic spectrum of the interfering substance has a frequency greater than twice the wavelength modulation frequency, rather than twice that frequency. Thus, this interfering high frequency component can readily be eliminated by suitable signal processing applied to the output signal from the photoelectric detection device.

If the concentration of the interfering substance is extremely high in comparison with that of the substance to be measured, then, in addition to the measures described above, a wavelength-modulated derivative spectrometer according to the present invention can also be provided with means for substracting a certain amount from an output signal produced by the photoelectric detection means, such as to compensate for the remaining degree of interference in that signal due to the interfering substance. The amount which is thus substracted can be either fixed, or can be made proportional to the current concentration of the interfering substance, by performing continuous measurement of that concentration by means of a separate spectrometer or an additional exit slit in the main spectrometer. Use of a fixed signal for subtraction may be satisfactory in the case where the interfering substance consists of sulfur dioxide in stack gas, since the concentration does not usually vary by a substantial amount.

Since an output signal is produced by a wavelength-modulated derivative spectrometer according to the present invention only when the substance to be measured is actually present in a gas sample subjected to measurement, the name "self-modulating spectrometer" has been applied thereto in order to distinguish a spectrometer according to the present invention from wavelength-modulated derivative spectrometers of the prior art, which do not possess the particular combination of features which characterize the present invention.

It has been found that, using a self-modulating spectrometer according to the present invention, continuous measurement of ammonia concentration in stack gas can be performed with an error of approximately ±2 ppm, with a concentration of up to 300 ppm of sulfur dioxide in the gas. The measured amount can be read out on a simple display device, such as a data recorder, and no processing of the output data (e.g. computer analysis) is required.

The components of a self-modulating spectrometer according to the present invention can be generally summarized as follows. Means for producing a intensity-modulated light signal whose amplitude is substantially proportional to the concentration of a substance to be measured (having a relatively broad spectrum) and substantially independent of the concentration of another substance which may have a relatively narrow-band periodic spectrum, the latter means comprising an entrance slit which is illuminated by light passed through a mixture of the two substances, dispersion means such as a diffraction grating with suitable collimating and collecting optical means, and an exit slit through which light from the dispersion means is passed, and wavelength modulation means, for vibrating the optical axis of the light beam which passes through the exit slit. Photoelectric detection means on which the light output from the exit slit is incident, to be thereby converted into an electrical signal. Filter and amplification means for removing components of the electrical signal thus produced other than that having a frequency of twice the wavelength modulation frequency, to thereby produce an electrical signal whose amplitude is determined by the concentration of the substance to be measured within the sampled gas passed through the absorption cell. And display means for indicating the latter electrical signal amplitude, to thereby indicate the concentration of substance to be measured. In addition, it is an essential feature of such a self-modulating spectrometer according to the present invention that the dimensions of the entrance and exit slits and the amplitude of wavelength modulation are selected to have values determined by the period of the periodic spectrum of a substance which is combined in the gas sample with the substance to be measured, in such a way that the output signal from the filter and amplification means will be substantially independent of the concentration of the substance having a periodic spectrum, as will be described hereinafter.

DESCRIPTION OF THE PREFERRED EMBODIMENTS

Figure 1:
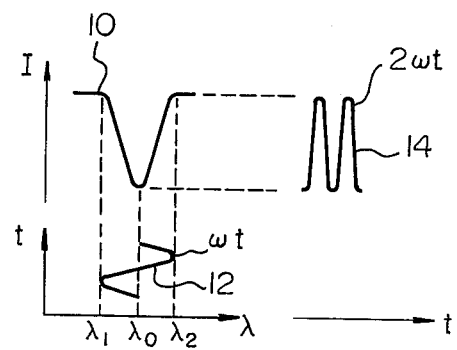
FIG. 1 is a diagram for assistance in describing the principles of a wavelength-modulated derivative spectrometer.

Before describing the preferred embodiments of the present invention, a brief description of the basic principles of a wavelength-modulated derivative spectrometer will be given, with reference to FIG. 1. This description is applicable both to the operation of a wavelength-modulated derivative spectrometer of the prior art and to that of a self-modulating spectrometer according to the present invention. In FIG. 1, reference numeral 10 denotes the spectrum of some substance, drawn as a graph having light intensity denoted as I plotted along the vertical axis and having light wavelength $\lambda$ plotted along the horizontal axis. Spectrum 10 has a minimum value at a wavelength $\lambda_0$ if wavelength modulation at a modulation frequency of $\omega$ is performed upon light of spectrum 10, with the center frequency of this wavelength modulation being at $\lambda_0$ and with the values of the modulation peak wavelengths being $\lambda_1$ and $\lambda_2$, as shown by curve 12 (plotted with time t along the vertical axis and wavelength along the horizontal axis), then this modulation by $\omega t$ will result in a light intensity-modulated electrical signal $2\omega t$ being produced, having a frequency $2\omega$. This light intensity-modulated electrical signal $2\omega t$ is denoted by curve 14 in FIG. 1, which is plotted with light intensity I along the vertical axis and time t along the horizontal axis. The amplitude of this light intensity-modulated electrical signal $2\omega t$ will be proportional to the second derivative of the curvature of spectrum 10 at the wavelength $\lambda_0$. In other words, the amplitude of the light intensity-modulated electrical signal is proportional to the degree of curvature of spectrum 10 at wavelength $\lambda_0$. It will therefore be apparent that this method of spectrometry, generally referred to as wavelength-modulated derivative spectrometry, can be utilized to measure a spectrum which has a high degree of curvature at some particular wavelength, and that sensitivity of such measurement will increase in proportion to the degree of curvature of the spectrum at that wavelength, i.e. in proportion to the second derivative of the spectrum at that wavelength. Thus, this method can be used to measure the concentration of a substance whose spectrum has a high degree of curvature at a particular wavelength, even if this substance is combined with other substances, provided that the spectra of the latter substances have a lower degree of curvature than that of the substance to be measured, in the vicinity of the measurement wavelength. For this reason such wavelength-modulated derivative spectrometry has been described in the prior art, for use in measuring concentrations of a substance having a periodic spectrum of relatively short period (and hence a relatively high degree of curvature) in the presence of a substance having a periodic spectrum of relatively long period (and hence a relatively low degree of curvature of the spectrum).

However, until now it has not been possible to utilize this wavelength-modulated derivative spectrometry when the relationship between the curvature of the spectrum of a substance to be measured and that of another substance combined therewith is opposite to that described above. In other words, it has not been possible to measure the concentration of a substance whose spectrum has a relatively low degree of curvature and which is combined with a substance whose spectrum is periodic and has a relatively high degree of curvature. This is because the light intensity-modulated electrical signal component resulting from the latter substance will mask that of the substance which is to be measured. Thus, for example it has not been possible hitherto to apply the method of wavelength-modulated derivative spectrometry in a direct and simple manner to the measurement of small amounts of ammonia which are contained in stack gas with sulfur dioxide, or to measure iodine ($I_2$) or chlorine ($Cl_2$) concentrations in the presence of the nitrogen dioxide. The basis of a self-modulating spectrometer according to the present invention is that of setting the dimensions of exit and entrance slits of the spectrometer, together with the amplitude of wavelength modulation, such that the unwanted periodic spectrum is suppressed, while at the same time these dimensions and modulation amplitude are such that measurement of the spectrum of the desired substance is performed by the method of wavelength-modulated derivative spectrometry. With a wavelength-modulated derivative spectrometer according to the prior art, on the other hand, it is only attempted to optimise the sensitivity and resolution of measurement of the spectrum of a desired substance, and no provision is made for suppressing a light intensity-modulated electrical signal resulting from the presence of another substance together with that being measured.

The basic principles of a self-modulating spectrometer will now be discussed. In the following, the spectrum which is emitted from the spectroscope (i.e. which is applied from the exit slit of the spectroscope to the photoelectric detection device) will be designated as $g(\lambda)$, the true incident spectrum (i.e. that incident upon the entrance slit) will be designated as $f(\lambda)$, and the slit function of the spectroscope will be designated as $O(")$. The following relationship is then true:

$$g(\lambda) = O(\lambda) * f(\lambda)$$

i.e. $g(\lambda)$ is the convolution of $O(\lambda)$ and $f(\lambda)$. If the true incident spectrum $f(\lambda)$ has a periodic structure with a period of $\Delta\lambda_{pp}$, then if the full width of the half-maximum (abbreviated hereinafter to FWHM) of the slit function is denoted as $\Delta\lambda_s$ and if $\Delta\lambda_s \leq \frac{1}{2}\Delta\lambda_{pp}$, in other words if the slit function is such as to be capable of resolving the periodic structure of the true incident spectrum $f(\lambda)$ then it will be possible to measure the periodic structure of the true incident spectrum $f(\lambda)$.

The above conditions are, essentially, those which must be met by a prior art type of wavelength-modulated derivative spectrometer which has to measure a spectrum having a relatively high degree of curvature which may be combined with some other spectrum having a lower degree of curvature. However in the case of a self-modulating spectrometer according to the present invention, the following conditions must be met:

(a) If the substance whose spectrum to be measured is combined with a substance having a periodic spectrum, with the period of the latter periodic spectrum being designated as $\Delta\lambda_{pp}$, and if the curvature of the latter spectrum is greater than that of the spectrum to be measured, then to suppress interference from the unwanted spectrum the slit width $\Delta\lambda_{s1}$ of the entrance slit should meet the following condition:

$$\Delta\lambda_{s1} \leq \frac{1}{2}\Delta\lambda_{pp}$$

In addition, the slit width $\Delta\lambda_{s2}$ of the exit slit should meet the following condition:

$$\tfrac{1}{2}\Delta\lambda_{pp} \leq \Delta\lambda_{s2} \leq \Delta\lambda_{pp}$$

while in addition, meeting the condition:

$$\Delta\lambda_{pp} \leq \Delta\lambda_{s1} + \Delta\lambda_{s2} \leq 3/2\Delta\lambda_{pp}$$

Furthermore, the amplitude of wavelength modulation designated as 2a (i.e. the peak-to-peak modulation amplitude) must meet the following condition:

$$2a \approx 5 \cdot \frac{\Delta\lambda_{pp}}{\pi}$$

The above conditions for the entrance and exit slits serve to ensure that interference from the unwanted spectrum is substantially suppressed, for reasons that will be discussed hereinafter. The condition for the amplitude of wavelength modulation serves to ensure that a light intensity-modulated electrical signal component at a frequency of twice the wavelength modulation frequency due to the interfering spectrum, i.e. a component representing the second derivative of the interfering spectrum at the measurement wavelength, will be effectively suppressed. Any components of the light intensity-modulated electrical signal of higher frequency, e.g. 3 or 4 times the wavelength modulation frequency, can be readily removed by suitable signal processing.

It is known that if a spectroscope has a slit function which is a triangular function with a half-width $\Delta\lambda_s$, then if the condition:

$$\Delta\lambda_s = \Delta\lambda_{pp}$$

is met, where $\Delta\lambda_{pp}$ is the period of an unwanted interfering periodic spectrum as discussed above, then the periodic structure spectrum will be substantially eliminated from the output of the spectroscope. The slit function can be made a triangular function with a half-width $\Delta\lambda_s$ by making the slit width of both the entrance slit and the exit slit equal to $\Delta\lambda_s$. If this is done, so that $\Delta\lambda_{s1} = \Delta\lambda_{s2} = \Delta\lambda_{pp}$, then the periodic structure spectrum can be substantially suppressed. However, complete suppression will not be attained with only these conditions being met.

The inventor has experimented with various combinations of entrance slit and exit slit widths. As a result, it has been found that the interfering spectrum can be almost completely eliminated if the conditions stated hereinabove for the slit widths of the entrance slit and the exit slit are met, i.e. if $$\Delta\lambda_{s1} \leq \tfrac{1}{2}\Delta\lambda_{pp}$$

$$\tfrac{1}{2}\Delta\lambda_{pp} \leq \Delta\lambda_{s2} \leq \Delta\lambda_{pp}$$

$$\Delta\lambda_{pp} \leq \Delta\lambda_{s1} + \Delta\lambda_{s2} \leq 3/2\Delta\lambda_{pp}$$

The above conditions can be met if the spectroscope has a rectangular or trapezoidal slit function and if the full-width of the slit function is equal to, or at most 1.5 times the value of $\Delta\lambda_{pp}$.

Figure 2:
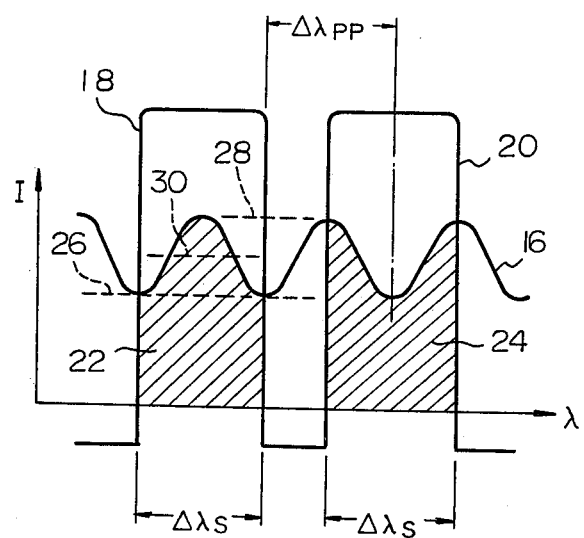
FIG. 2 is a diagram for assistance in describing the suppression of interference from a spectrum having a periodic structure, by appropriate selection of a slit function of the spectroscope.

In FIG. 2, reference numeral 16 denotes a periodic spectrum having a period $\Delta\lambda_{pp}$. If this spectrum is analyzed by using a spectroscope which has a rectangular slit function of a full-width $\Delta\lambda_s$, and if the range of spectrum wavelengths selected by the spectroscope falls within curve 18, representing the slit function of the spectroscope, then the integral of the light intensity which is output from the spectroscope will be equal to the hatched area 22. If now the range of spectral wavelengths measured by the spectroscope is changed to fall within curve 20 (i.e. the slit function is moved along the wavelength axis), then the total light intensity which is output from the spectroscope will become as indicated by hatched area 24 in FIG. 2. It will be apparent that if the slit function is rectangular, and if $\Delta\lambda_s$ is approximately equal to $\Delta\lambda_{pp}$, then variation of the range of wavelengths of the periodic spectrum which are sampled by the spectroscope will not result in a change in the intensity of light output from the spectroscope, i.e. the space of hatched area 22 is equal to that of hatched area 24 in FIG. 2. Thus, if wavelength modulation is applied (which can be considered as equivalent to periodic movement of the slit function with respect to the wavelength axis, or periodic variation of the range of wavelengths sampled by the spectroscope) then no light intensity modulated electrical signal component will be produced due to the periodic spectrum 16. However, if the periodic spectrum 16 is combined with another, relatively broad-band spectrum having a lower degree of curvature, then it will be possible to produce a light intensity-modulated electrical signal, i.e. a second derivative signal, by wavelength modulation as described above with reference to FIG. 1.

The more closely the slit function of the spectroscope approaches a rectangular (or trapezoidal) function, rather than a triangular function, the greater will be the degree of suppression of the unwanted periodic spectrum. In addition, it has been confirmed by experiment that the preconditions for the entrance and exit slits given hereinabove, whereby the entrance slit is made relatively narrow and the exit slit relatively wide, will result in highly effective suppression of the unwanted periodic spectrum.

The amplitude of wavelength modulation will now be discussed. A periodic spectrum designated as $f(\lambda)$ can be closely approximated by the following expression:

$$f(\lambda) = f_b(\lambda) + B \cdot \cos\left(\frac{\lambda - \lambda_{oo}}{\Delta\lambda_{pp}} \cdot 2\pi\right) \quad (1)$$

where $f_b(\lambda)$ represents a relatively broad spectrum (i.e. a spectrum which appears uniform if measurement is limited to a narrow band of wavelengths), $\lambda_{oo}$ is the central wavelength of the wavelength modulation and B is the amplitude of the periodic structure of the periodic spectrum. If the wavelength modulation applied to this periodic spectrum is expressed as:

$$\lambda = \lambda_o + a \cdot \sin\omega t,$$

then the amplitude of a light intensity-modulated electrical signal produced by the spectrometer, designated as P(t), is given as follows:

$$P(t) = \overline{f_b} + B \cdot \cos(x \cdot \sin\omega t + \alpha) \quad (2)$$

$$= \overline{f_b} + B\{\cos(x \cdot \sin\omega t) \cdot \cos\alpha - \sin(x \cdot \sin\omega t) \cdot \sin\alpha\}$$

$$= \overline{f_b} + B \cdot \cos\alpha \left\{ J_0(x) + 2 \sum_{n=1}^{\infty} J_{2n}(x) \cdot \cos(2n\omega t) \right\}$$

-continued $$-B\cdot\sin\alpha\left\{2\sum_{n=1}^{\infty}J_{2n+1}(x)\cdot\sin(2n+1)\omega t\right\}$$

$$=\overline{P}+B\cdot\cos\alpha\left\{2\sum_{n=1}^{\infty}J_{2n}(x)\cdot\cos(2n\omega t)\right\}$$

$$-B\cdot\sin\alpha\left\{2\sum_{n=1}^{\infty}J_{2n+1}(x)\cdot\sin(2n+1)\omega t\right\}$$

In the above, $f_b = f_b(\lambda_o + a\cdot\sin\omega t)$, and $\overline{f_b}$ is approximately constant, if the amplitude a is small. In addition, $\overline{P} = \overline{f_b} + B\cdot\cos\alpha\cdot J_o(x)$ and also $$\alpha = 2\pi(\lambda_o - \lambda_{oo})/\Delta\lambda_{pp} \text{ and,}$$

$$x = 2\pi a/\Delta\lambda_{pp}$$

It can be seen from equation (2) above that the light intensity-modulated electrical signal produced by wavelength modulation, having a frequency $2\omega$, will have an amplitude which is given as a first order Bessel function $J_2(x)$. This takes a maximum value when $x \approx 3$, and becomes zero when $x \approx 5$. Accordingly, if the amplitude a of wavelength modulation is expressed as:

$$a = 5\cdot\frac{\Delta\lambda_{pp}}{2\pi},$$

i.e. if the peak-to-peak amplitude of wavelength modulation is $5/\pi$ times the value of $\Delta\lambda_{pp}$, then the second derivative of the periodic spectrum will become zero. Thus, measurement of the spectrum of a relatively broad-band spectrum which is combined with the periodic spectrum referred to above can be performed, if the spectrometer constants are selected such that the second derivative of the relatively broad spectrum does not become zero, while that of the periodic spectrum goes to zero.

The above points have been confirmed by experiments.

The essential features of a self-modulating spectrometer according to the present invention, for measuring a relatively broad-band absorption spectrum while suppressing a relatively narrow-band periodic spectrum superimposed thereon will now be described. Such a spectrometer comprises an entrance slit having a slit width which is less than one half of the period of structure of the periodic absorption spectrum, an exit slit having a slit width which is greater than one half of the period of the structure of the periodic spectrum, and with the slit function of the spectrometer as determined by the slit widths of the entrance and exit slits in conjunction being either a rectangular or trapezoidal function and having a full-width which is approximately equal to or at most 1.5 times the period of the periodic spectrum, light dispersion means provided between the entrance and exit slits, wavelength modulation means for periodically scanning the wavelength of light passed out from the exit slit, the latter means comprising for example means for vibrating the entrance slit or the exit slit, or other optical vibration means such as a vibrating diffraction plate, a vibrating mirror, or a vibrating refractive plate, etc, this wavelength modulation means acting to produce a peak-to-peak amplitude of wavelength modulation which is substantially equal to $5/\pi$ times the period of the periodic spectrum structure.

In the following, embodiments of the present invention will be described for use in measuring the concentration of ammonia in stack gases produced by plant such as a boiler furnace. In addition to the basic theoretical data given above, these embodiments are based upon the following facts which have been experimentally found by the inventor:

1. Substances contained in stack gas whose spectra can become superimposed on that of ammonia include nitric oxide (NO), sulfur dioxide ($SO_2$), unsaturated hydrocarbons, aromatic hydrocarbons, etc.

2. Absorption spectrum peaks of NO occur at wavelengths of 205 nanometers (nm), at 215 nm, and at 226 nm. When performing spectroscopic analysis for ammonia, it is necessary to eliminate the effects of these absorption peaks.

3. Sulfur dioxide displays a strongly periodic absorption spectrum in the range 200 to 300 nm, with a period of this spectrum structure of approximately 2 nm. It is not possible to completely eliminate the effects of this spectrum when performing measurements for ammonia.

4. At short wavelengths, in the region of 200 nm or less, a large level of interference occurs due to unsaturated hydrocarbons and aromatic hydrocarbons. The absorption spectra of these are very strong. In addition, interference also results, at these wavelengths due to absorption by atmospheric oxygen. It is therefore preferable to perform measurements of the absorption spectrum of $NH_3$ at wavelengths of 205 nm or longer.

5. Absorption spectrum peaks of ammonia occur at wavelenghts of 205 nm, 209 nm, 213 nm, 217 nm, and 221 nm.

6. By applying the self-modulating spectrometer method of the present invention, it has been found that the most suitable wavelengths for measuring the absorption spectrum of $NH_3$ are at 209 nm or at 219 nm. This has been found by second derivative measurement of the spectra of $NH_3$, NO, and $SO_2$. At either of these wavelengths, interference from NO is almost zero and interference from $SO_2$ is very small.

7. If the slit width $\Delta\lambda_{s1}$ of the entrance slit is made less than 1 nm, and the slit width $\Delta\lambda_{s2}$ of the exit slit is made greater than or equal to 1 nm, while the relationship:

$$2 \text{ nm} \leq \Delta\lambda_{s1} + \Delta\lambda_{s2} \leq 3 \text{ nm}$$

is established, then the interference from $SO_2$ can be made very small.

8. In addition to the factors stated in paragraph 7 above, if the amplitude of wavelength modulation (i.e. the peak to peak amplitude) is made equal to $3.2 \pm 0.3$ nm, then the interference from $SO_2$ can be made very small. This amplitude corresponds approximately to a value of $5/\pi$ times the period of the periodic absorption spectrum of $SO_2$.

Figure 3:
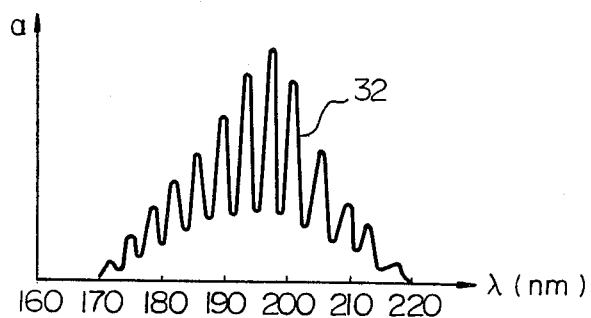
FIG. 3 is a diagram showing the structure of the spectrum of ammonia.

The absorption spectrum of ammonia in the ultraviolet wavelength range is shown in FIG. 3, with wavelength being plotted along the horizontal axis in units of nm, and the degree of absorption a being plotted along the vertical axis. Curve 32 indicates the normal ultraviolet absorption spectrum of $NH_3$. Strong absorption occurs at wavelengths which are shorter than 205 nm, but if measurement of stack gas is made at such wavelenghts, strong interference occurs due to absorption by atmospheric oxygen and by hydrocarbons, in particular unsaturated hydrocarbons and aromatic hydrocarbons.

Figure 4:
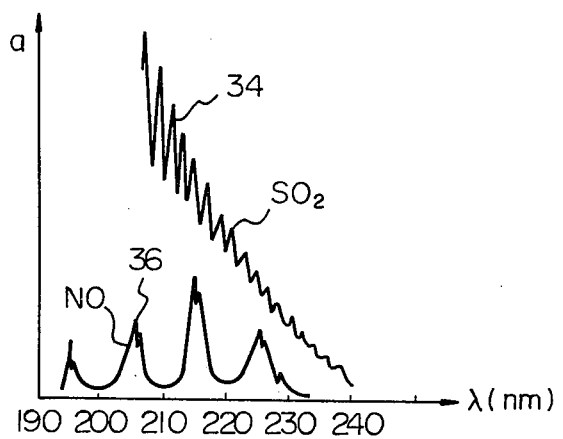
FIG. 4 is a diagram showing the structures of the spectra of sulfur dioxide and of nitric oxide.

The measurement for NH₃ should therefore be carried out at wavelenghts longer than 205 nm. However, at such wavelenghts, interference occurs due to the absorption spectrum of NO and of SO₂, which occur in large quantities in stack gas. The absorption spectra of NO and of SO₂ are as shown in FIG. 4. As can be seen, absorption spectrum peaks of NO occur close to 205 nm, 215 nm and 226 nm. Interference by the NO spectrum, in performing measurement for NH₃, can be greatly reduced by performing measurement at a wavelength of approximately 209 nm, 213 nm and 217 nm. However it has been found by experiment that in fact substantial interference due to NO still occurs at wavelengths of 213 nm and 217, so that it is preferable not to perform measurement for NH₃ at these wavelengths.

Figure 5:
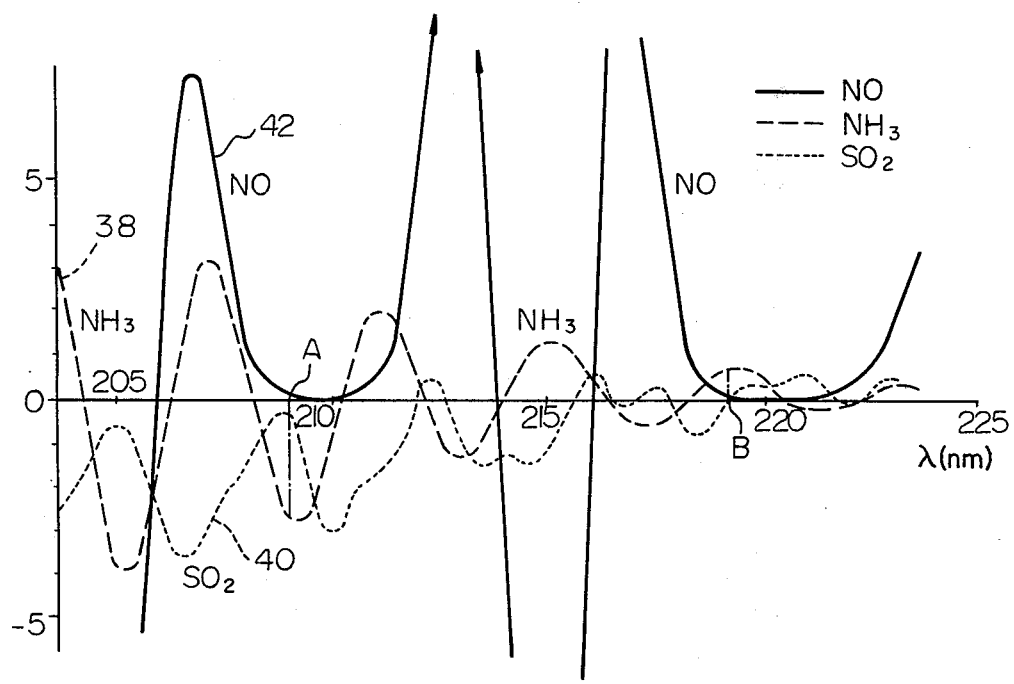
FIG. 5 shows the results of measurment of the spectra of ammonia, sulfur dioxide and nitric oxide by a wavelength-modulated derivative spectrometer according to the present invention.

FIG. 5 shows the relationship between output signal amplitude from a self-modulating spectrometer according to the present invention and wavelength, for NH₃, NO and SO₂ contained in stack gas, i.e. the amplitude of the light intensity-modulated electrical signal output from the spectrometer for each of these gas components. The measurements were performed with a spectrometer entrance and exit slit width both of 1.6 nm, and with a wavelength modulation amplitude of 3 nm. As can be seen, the only wavelengths for which interference from NO is very low are near 210 nm or near 220 nm. As can also be seen from FIG. 5, if measurement is performed at wavelengths in the region of 209 nm, indicated by A in the diagram, then the amplitude of the light intensity-modulated electrical signal for SO₂ at that wavelength will not be zero, i.e. it is not possible to make the interference due to SO₂ exactly zero at that wavelength. Actually, when the concentration of SO₂ was 100 ppm, the interference for NH₃ measurement resulting from this concentration of SO₂ was from 2 to 3 ppm NH₃. Moreover, this interference increased in proportion to the concentration of SO₂. Consequently, it may be said that the interference resulting from the SO₂ is too large to measure NH₃ accurately. In actual fact, the concentration of SO₂ in the stack gas from a heavy oil fired boiler or coal fired boiler can reach 2000 ppm. In such a case, even using a measurement wavelength of approximately 209 nm, measurement of NH₃ concentration may be difficult or impossible.

Using a measurement wavelength of approximately 219 nm, designated as B in FIG. 5, the interference due to SO₂ is less than at 209 nm. However, even if measurement is performed at this wavelength, and even if a special circuit (described hereinafter) is used to reduce interference caused by SO₂, accurate measurement of NH₃ is only possible up to an SO₂ concentration of the order of 600 ppm. The limit of identification for NH₃ measurement was 1 ppm or less, since the sensitivity of NH₃ measurement at the measuring wavelength of approximately 219 nm was low as can be seen from FIG. 5.

In obtaining the results described above and shown in FIG. 5, a self-modulating spectrometer was used in which only the first of the basic principles of the present invention as described above was employed, i.e. the condition for the amplitude of wavelength modulation. The period $\Delta\lambda_s = \Delta\lambda_{pp}$ of the periodic spectrum of SO₂ is close to 2 nm, and so a wavelength modulation peak amplitude a was determined as:

$$a \approx 5 \cdot \frac{\Delta\lambda_{pp}}{2\pi} \approx 1.6 \text{ nm}$$

so that interference from SO₂ is minimized. However, a conventional design method was used to determine the slit function of the spectrometer. This was made a triangular slit function with a half-width $\Delta\lambda_s$ such that $\Delta\lambda_{pp}$. According to conventional theory, using such a triangular function should result in effective suppression of interference from the periodic spectrum with period $\Delta\lambda_{pp}$. Thus, in accordance with to conventional theory, the slit function of the spectrometer was made a triangular function with a half-width equal to 1.6 nm, which is close to 2 nm, and this was achieved by making the slit widths of the entrance and exit slits equal to 1.6 nm. However, as has been described above, use of such a slit function will not enable satisfactory measurement of NH₃ in stack gas, due to the high concentration of SO₂. The inventor has thus performed experiments with various combinations of slit widths for improved suppression of SO₂ interference. From these experiments, it has been found that if the entrance slit width is made less than 1 nm, while the exit slit width is made greater than 1 nm, while the condition:

$$2 \text{ nm} \leq \Delta\lambda_{s1} + \Delta\lambda_{s2} \leq 3 \text{ nm}$$

is met, then interference due to SO₂ can be made extremely small.

Figure 6:
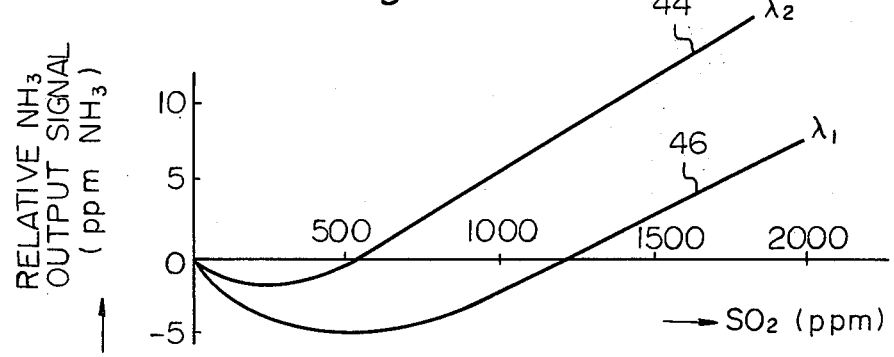
FIG. 6 is a diagram illustrating the relationship between the amount of interference produced by sulfur dioxide in a sample of gas containing ammonia and sulfur dioxide, and the concentration of sulfur dioxide.

If the above conditions are met, then the relationship between interference by SO₂ (expressed as a relative concentration of NH₃, measured as a spectrometer output signal amplitude) and concentration of SO₂ become as shown in FIG. 6. As shown, if the concentration of SO₂ is less than 2000 ppm, then the relative NH₃ output representing interference from SO₂ falls within the limits −5 ppm to +10 ppm. In other words, the SO₂ interference can be made extremely small. In FIG. 6, curve 44 and curve 46 represent the SO₂ interference characteristics for two different values of measurement wavelength, $\lambda_1$ and $\lambda_2$, each of which is close to 209 nm. As can be seen, the interference characteristics are very closely dependent upon the measurement wavelength.

Figure 7:
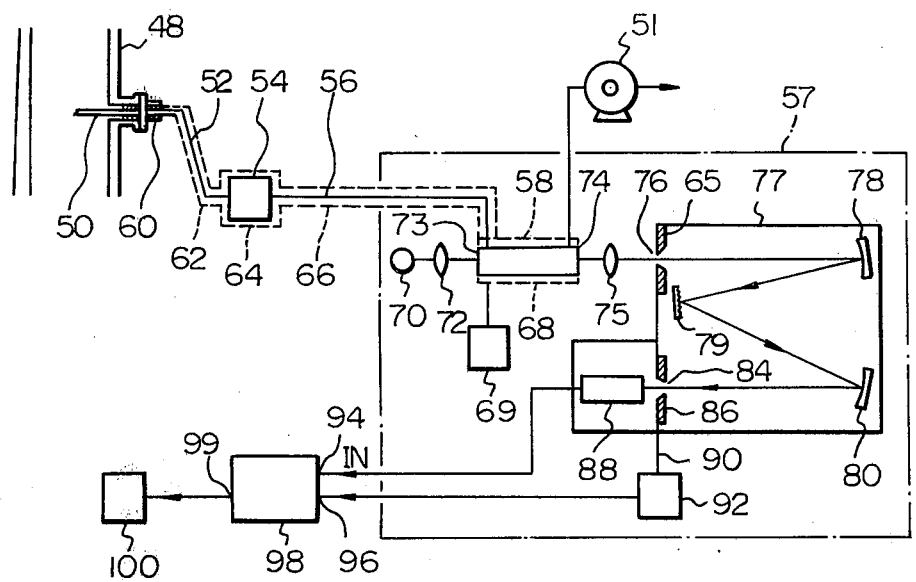
FIG. 7 is a general block diagram of a first embodiment of a spectrometer according to the present invention.

Specific embodiments of a self-modulating spectrometer according to the present invention will now be described, with reference first to FIG. 7. FIG. 7 is a general block diagram of an embodiment of a self-modulating spectrometer according to the present invention which is used to continuously measure the concentration of NH₃ in stack gas. Reference numeral 48 denotes the stack, into which a probe 50 is inserted to sample the stack gas. The gas is drawn into probe 50 by means of a suction pump 51, passed through a dust-extraction filter 54, and the cleaned gas is led continuously through a light absorption cell 58. The sampled gas is held at a predetermined high temperature, while flowing from probe 50 through light absorption cell 58, by means of heaters, denoted by numerals 60, 62, 64, 66 and 68, which are wound around probe 50, intake tube 52, dust extraction filter 54, sampling tube 56, and light absorption cell 58. These heaters are controlled by temperature control equipment (not shown in the drawings), such as to maintain the sample gas temperature within the range 300° C. to 350° C. However cell heater 68 is controlled by a temperature control unit 69 such as to maintain the temperature of the gas within light absorption cell 58 at precisely 350° C. By holding the sample gas at a constant high temperature in this way, chemical reaction between $NH_3$ and $SO_2$ and condensation of water vapor in the gas is prevented. Such chemical reaction result in some $NH_3$ becoming reduced or dissolved so that the proportion of $NH_3$ would be reduced. The heating therefore serves to assure that the proportion of $NH_3$ in the light absorption cell 58 is identical to that in the stack 48.

Numeral 70 denotes a light source, whose light is formed into a parallel beam by a collimating lens 72, and then enters the light absorption cell 58 through an entrance window 73 and passes out through an exit window 74. The spectroscope, denoted by numeral 77, has an entrance slit 76 formed in an entrance slit plate 65 through which light from light absorption cell 58 enters, this light being focussed on entrance slit 76 by a lens 75. The light from entrance slit 76 then is reflected by a collimating mirror 78 onto the dispersion element of the spectroscope which in this embodiment comprises a diffraction grating 79, and then by a collector mirror 80. An image of the $NH_3$ absorption spectrum is thereby formed near the exit slit 84, which is formed in a plate 86. This light is within a predetermined narrow range of wavelengths, the center wavelength thereof being referred to herein as the measurement wavelength. Light which passes through exit slit 84 falls on a photomultiplier tube 88. Slit plate 86 is attached to the free end of one arm of a U-shaped tuning fork 90. The tuning fork 90 is driven at its resonant frequency of vibration by a tuning fork drive unit 140, to thereby vibrate exit slit 84 in a sinusoidal manner. This vibration of exit slit 84 results in wavelength modulation of the light which passes through exit slit 84. Thus, a light intensity-modulated electrical signal is produced by photomultiplier tube 126 in response to the wavelength modulation of the light applied thereto. If the gas passing through light absorption cell 58 includes $NH_3$, and if the slit widths and amplitude of wavelength modulation have been selected as described hereinabove such as to suppress interference from $SO_2$ and NO components of the stack gas, then the amplitude of the output signal from photomultiplier tube 126 will represent the concentration of $NH_3$ in the stack gas, i.e. photomultiplier tube 126 will a light intensity modulated electrical signal whose amplitude will be proportional to the concentration of $NH_3$ in the sampled gas. The latter signal amplitude is determined by the second derivative of the light intensity/wavelength characteristic of the $NH_3$ in the measurement wavelength range, as has been described hereinabove in the explanation of the principles of wavelength modulated derivative spectrometry given with reference to FIG. 1. As explained therein, the magnitude of this second derivative is proportional to a component of the light intensity-modulated electrical signal whose frequency is twice that of the wavelength modulation frequency, i.e. twice that of the frequency at which tuning fork 90 is driven by tuning fork drive unit 92. This component is detected and amplified by a signal processing circuit 98, as described hereinafter. The light intensity modulated electrical signal from photomultiplier tube 126 is applied to an input terminal 94 of signal processing circuit 98 while a synchronizing signal from tuning fork drive unit 92 is applied to an input terminal 96.

An output signal from signal processing circuit 98 is applied to a display device 100, which thereby indicates the concentration of $NH_3$ in the sampled stack gas passed through light absorption cell 58.

Display device 100 can comprise, for example, a voltmeter or an electrical recorder, calibrated in units of $NH_3$ gas concentration.

The basic specifications of the first embodiment of FIG. 7 are as follows. The focal length of the spectroscope is 250 mm, the ruled grooves of the diffraction grating are 1200 lines per mm, and reciprocal dispersion is 3.1 nm per mm. The width of the entrance slit is 0.2 mm, the exit slit width is 0.5 mm, and the full-width is a trapezoidal slit function having a width (expressed in terms of wavelength) of 2.2 nm. The half-width of the slit function is 1.6 nm, so that the slit function is close to being rectangular. In general, the wider the slit width is made, the poorer will be the resolution. Thus, in the absence of other factors, selection of a triangular slit function of the order of 0.5 nm to 1 nm would be preferable. However as described hereinabove, use of a full-width of slit function close to 2.0 nm is desirable in order to reduce interference from $SO_2$ gas, and for this reason a trapezoidal slit function with a full-width of 2.2 nm was utilized.

Figure 8:
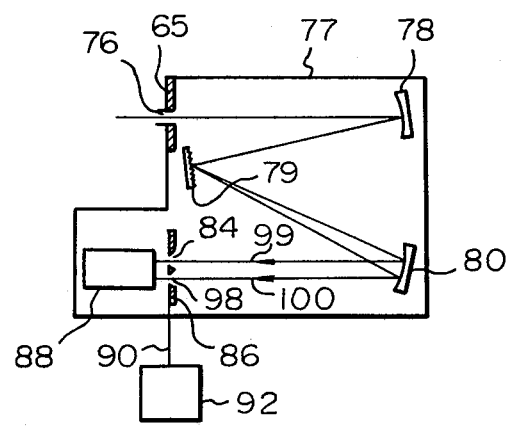
FIG. 8 is a diagram for providing more detailed description of an arrangement of exit slits in the embodiment of FIG. 7.

In order to set the measurement wavelength to 209 nm, it is necessary to adjust the position of exit slit 84 so that light of this wavelength passes therethrough. This is performed by adjusting the position of slit plate 86 with respect to the optical axis of the spectroscope. The interior of spectroscope 77 is shown in greater detail in FIG. 8 to assist in describing how this adjustment is performed. In FIG. 8, numeral 99 denotes the optical axis of $NH_3$ spectrum light at a wavelength of 209 nm, while numeral 100 denotes the optical axis of light at the wavelength of an emission line of mercury, i.e. 253.7 nm. In addition to exit slit 84 described above, another exit slit 98 is provided in slit plate 86, with the spacing between slits 84 and 98 being equal to the spacing between the optical axes 99 and 100, and with the photomultiplier tube 88 being arranged such that any light passing out from slit 98 will fall on a photosensitive face thereof. Precise adjustment of the spectroscope can now be rapidly and simply performed by illuminating entrance slit 76 with light from a mercury vapor lamp. Dispersion of this light will be performed by diffraction grating 79, and light at the wavelength of a 253.7 nm emission line will pass along optical axis 100. With tuning fork 90 being vibrated, to vibrate slit plate 86, the magnitude of the second derivative component, being at a frequency of twice the tuning fork vibration (i.e. wavelength modulation frequency) of the light intensity-modulated electrical signal output from photomultiplier tube 88 can now be monitored, and the position of slit plate 86 adjusted until this signal amplitude is at a maximum. Slit plate 86 is now correctly positioned with respect to optical axes 99 and 100, so that light at a wavelength of 209 nm passes through exit slit 84.

The above method of adjustment, in which diffraction grating 79 is kept fixed in position, is preferable to conventional methods of adjustment, in which the diffraction grating is rotated and wavelength scanning is employed.

In this embodiment, the amplitude of vibration of exit slit 84 is 1.2 mm, which is equal to 3.1 nm, expressed in terms of wavelength.

Figure 9:
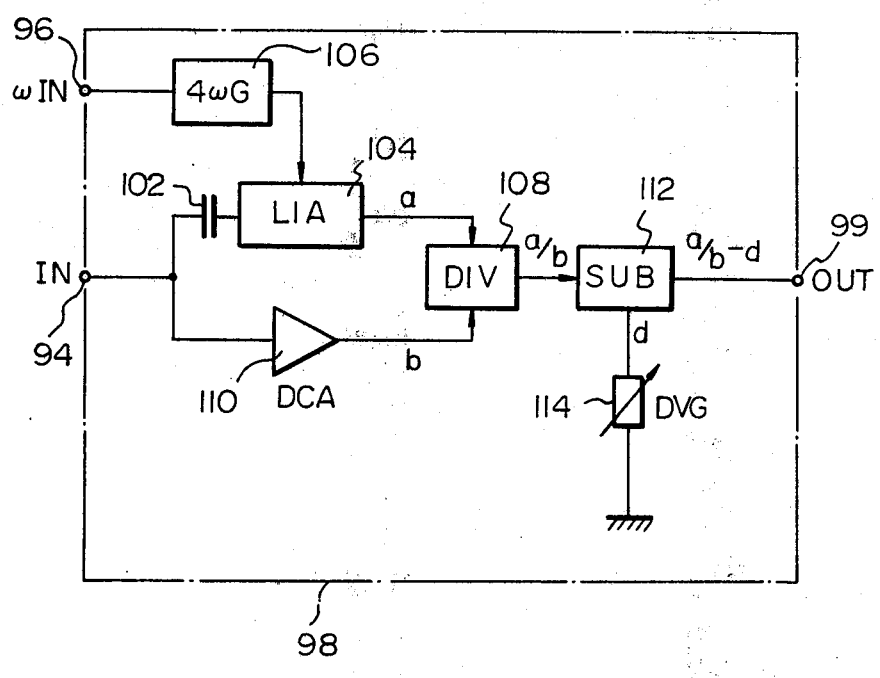
FIG. 9 is a block diagram of an amplifier used in the embodiment of FIG. 7.

An example of signal processing circuit 98 will now be described, with reference to FIG. 9. Here, the output signal from photomultiplier tube 126 is applied to an input terminal 94. This signal includes an AC component at a frequency of twice the wavelength modulation frequency, i.e. twice the frequency of vibration of tuning fork 90 (this component being the second derivative component of the light intensity-modulated electrical signal) and a DC component, representing the amount of light reaching photomultiplier tube 126. The AC component is selected by means of a capacitor 102, and is input to a type of synchronous amplifier (called also a phase-sensitive detector), generally referred to as a lock-in amplifier (LIA). A signal at the wavelength modulation frequency $\omega$ is applied to input terminal 96, and is applied to a frequency quadrupler circuit 106 to produce a synchronizing signal at a frequency of $4\omega$. This synchronizing signal is applied to LIA 104, which is responsive thereto for amplifying only the component of the light intensity-modulated electrical signal which is at a frequency $2\omega$, i.e. the second derivative component, and produces an output voltage of a predetermined polarity designated as a whose amplitude is proportional to the second derivative component. The DC component of the output signal from photomultiplier tube 126 is amplified by a DC amplifier 110, to produce an output voltage b. The ratio of voltages a/b is then generated by a divider circuit 108. This is necessary since the voltage a is not only proportional to the concentration of $NH_3$ in the sample gas, but also proportional to the average intensity of light falling on the photomultiplier tube 88. The ratio a/b is independent of variations in this total light intensity. To minimize interference from the $SO_2$ spectrum, a voltage d representing this interference is substracted from the ratio a/b, by means of a subtraction circuit 112. In this embodiment, this voltage d is generated by a DC voltage generator 114, and can be preset to a desired value.

Using this embodiment, the spectrometer was set up for $NH_3$ concentration measurement by adjusting the measurement wavelength to be close to 209 nm, and to be such as to give the $SO_2$ interference characteristic denoted by numeral 46 in FIG. 6, and by setting the value of DC voltage d to correspond to an $NH_3$ concentration of $-4.7$ ppm. Measurement of stack gas was then performed, with the concentration of $SO_2$ therein varying in the range 400 ppm to 600 ppm. It was found that measurement of small concentrations of $NH_3$ could be performed to an accuracy of approximately 0.2 ppm, within this range of concentrations of $SO_2$.

The essential features of a self-modulating spectrometer according to the embodiment of FIG. 7, for measurement of $NH_3$ concentration in stack gas, can be summarized as follows. The width of the entrance slit (measured in terms of wavelength) is less than 1 nm. The exit slit width is such that the sum of this width and that of the entrance slit has an effective value of between 2 nm and 3 nm. The amplitude of wavelength modulation has a wavelength equivalent value of $3.2 \pm 0.3$ nm, and the central wavelength of this wavelength modulation is approximately 209 nm. Such a self-modulating spectrometer is suitable for measurement of sample gas including $NH_3$, $SO_2$, and NO.

Figure 10:
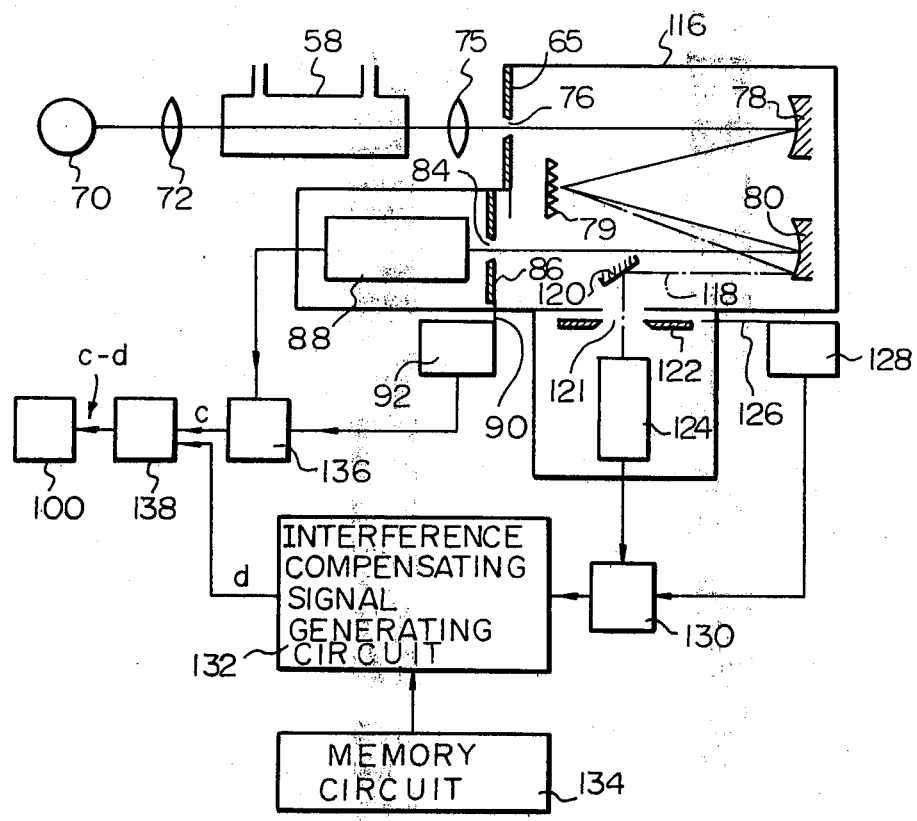
FIG. 10 is a general block diagram of a second embodiment of a spectrometer according to the present invention.

A second embodiment of a self-modulating spectrometer according to the present invention will now be described, with reference to FIG. 10. This embodiment is basically similar to the first embodiment described above, and is also suitable for measurement of trace amounts of $NH_3$ contained in stack gas together with a high concentration of $SO_2$. In FIG. 10, components which are identical in nature and function to components of the first embodiment in FIG. 7 and FIG. 8 are designated by corresponding reference numerals, and will not be described further. In addition, certain other elements of the first embodiment such as the sampling probe 50 and the heaters have been omitted from FIG. 10, for simplicity of description. The essential difference between the second embodiment of FIG. 10 and the first embodiment lies in the fact that measurement of the concentration of $SO_2$ in the sampled stack gas is performed continuously, and the $NH_3$ concentration measurement is corrected for interference by $SO_2$ on the basis of this $SO_2$ measurement. In order to perform this continuous measurement of $SO_2$ concentration, a flat surface mirror 120 is positioned within the spectroscope 116, and reflects light at a wavelength of approximately 300 nm through an exit slit 121 which is formed in a slit plate 122. Slit plate 122 is mounted on a tuning fork 126, driven by a drive unit 128. Wavelength modulation of the light passed through exit slit 121 is thereby performed, causing a intensity-modulated light signal to be produced by photomultiplier tube 124. The light intensity modulated electrical signal output from photomultiplier tube 124 is applied, together with a synchronizing input signal from drive unit 128, to a signal processing circuit 130. Processing of these input signals is then performed as described for the signal processing circuit 98 in FIG. 9 (but with DC voltage generator 114 and subtraction circuit 112 omitted), to produce an output voltage which is proportional to the concentration of $SO_2$ in the sampled stack gas. Numeral 134 denotes memory circuit means, in which is stored data corresponding to a relationship between $SO_2$ interference and $SO_2$ concentration, e.g. a relationship such as is indicated by curve 44 or curve 46 in FIG. 6. The output signal from signal processing circuit 130 is input to an interference compensation signal generating circuit 132, together with data from memory circuit 134. On the basis of these inputs, interference compensation signal generating circuit 132 produces an output signal, designated as d, whose amplitude represents the current level of interference due to $SO_2$ in the sampled gas. Numeral 136 denotes a signal processing circuit which has a similar function to signal processing circuit 98 of the first embodiment, but without subtraction circuit 112 and DC voltage generator 114, i.e. signal processing circuit 136 produces an output signal c which is equivalent to signal a/b of the first embodiment. This signal, together with the interference compensation signal d, is input to a compensation calculation circuit 138, which serves to subtract the value of interference compensation signal d from signal c, to thereby produce an output signal (c - d) which represents the concentration of $NH_3$ in the sampled stack gas, with interference due to $SO_2$ in that gas being substantially eliminated. The output signal (c - d) is therefore proportional to the concentration of $NH_3$ in the stack gas, to a high degree of accuracy.

From the above, it can be understood that the essential difference between the first and second embodiments lies in the fact that a predetermined fixed level of compensation is applied to the measurement of $NH_3$ to compensate for interference from $SO_2$, with the first embodiment. With the second embodiment, however, the amount of compensation is continuously varied in accordance with the current concentration of $SO_2$ in the sampled gas.

It should be noted that although a synchronous type of amplifier is used in the signal processing circuits (e.g. circuit 98) of the described embodiments, this is not essential to the present invention. The purpose of LIA 104 and frequency quadrupler circuit 106 in signal processing circuit 98 shown in FIG. 9 is to provide selective amplification of the second derivative component of the light intensity-modulated electrical signal from photomultiplier tube 88, while rejecting other components. This is achieved by performing amplification of only the light intensity-modulated electrical signal component which has a frequency of twice the wavelength modulation frequency $\omega$, and rejecting other components such as the component at a frequency $3\omega$ or $4\omega$ which is produced due to the $SO_2$ spectrum. However such selective amplification could also be performed by some other form of amplifier in conjunction with a suitable band-pass or low-pass filter.

In the second embodiment of FIG. 10, exit slit 121, used for $SO_2$ measurement, has a slit width of 0.6 nm (wavelength equivalent value), while the wavelength modulation amplitude is 1.8 nm. Since the period of the $SO_2$ spectrum structure is approximately 2 nm, these values of slit width and wavelength modulation amplitude provide good sensitivity for $SO_2$ measurement. The values of slit width 84 and the wavelength modulation amplitude can be identical to those given hereinabove for the first embodiment of FIG. 7.

Utilizing the second embodiment of FIG. 10, it has been found that measurement of $NH_3$ concentration can be performed to a sensitivity of approximately $\pm 0.2$ ppm, for sample gas which contains a concentration of up to 2000 ppm of $SO_2$.

It should be noted that the applications of a self-modulating spectrometer according to the present invention are not limited to the measurement of $NH_3$ concentrations in the presence of $SO_2$. Such a spectrometer can also be used for example to measure the absorption spectrum of ozone ($O_3$) in gas which includes $SO_2$. In this case, a measurement wavelength of the order of 260 nm is preferable. Ozone has a relatively broad-band spectrum by comparison with $SO_2$ so that the present invention is highly suited to such measurement.

A self-modulating spectrometer according to the present invention is also suitable for measurement of concentrations of iodine ($I_2$) or chlorine ($Cl_2$) in gas which contains $NO_2$. In this case, a measurement wavelength of the order of 400 to 500 nm is preferable.

It should also be noted that various modifications to the described embodiments are possible. For example, opposing mirrors can be positioned within the absorption cell of the spectrometer, so that light entering the cell is reflected back and forth before exiting, to thereby extend the absorption path length. This enables very low concentrations of $NH_3$ occurring in the environment, e.g. amounts of the order of 0.01 to 0.05 ppm to be accurately measured.

Furthermore, it is possible to utilize other methods of producing wavelength modulation with a self-modulating spectrometer according to the first embodiment of FIG. 7, rather than a vibrating slit plate. For example, such modulation can be achieved by vibration of the entrance slit, or by vibration of the diffraction grating 79 or by vibration of a flat mirror arranged on the optical axis in the spectroscope additionally.

In addition, a self-modulating spectrometer according to the present invention can also be modified to perform long-distance remote sensing spectroscopic observation. In this case sunlight can be used as a light source, rather than the artificial light source 70, and the light to be measured is passed directly into the entrance slit, without utilizing an absorption cell 58. Alternatively, a window can be provided in a stack containing the gases, and light passed through the gases and through this window to the entrance slit.

It should also be noted that there is at present a requirement for suitable means to measure residual $NH_3$ in stack gas from a nitrogen purging equipment which uses the $NH_3$ injection method. Prior art methods of performing such measurements have various disadvantages. One such method is a conductometric analysis. The conductometric analysis is insufficient for continuous measurement because its response is very poor. Another method is a chemical luminescence method, in which $NH_3$ is converted into NO, and then total NO being a mixture of the converted NO and the background NO in the stack gas is analysed by the chemical luminescence method. It is then necessary to compensate the value of NO concentration thus obtained by the conversion from $NH_3$, by subtracting an amount equivalent to the background level of NO in the stack gas. Such a chemical luminescence method is not suited to simple and practical continuous monitoring of $NH_3$ levels, while a self-modulating spectrometer according to the present invention is ideally suited to such a function, and can perform such measurement in an accurate and reliable manner. Such an application is typical of the various important areas of industry to which the present invention can be advantageously applied.

Furthermore, since a self-modulating spectrometer according to the present invention is highly suited to the detection of small concentrations of $O_3$, which is a principal component of photochemical smog, and $Cl_2$ which is a principal constituent of various atmospheric pollutants, such a spectrometer has important applications in the field of environmental protection.

From the preceding description it will be apparent that the objectives set forth for the present invention are effectively attained. Since various changes and modifications to the above embodiments may be made without departing from the spirit and scope of the present invention, it is intended that all matter contained in the above description or shown in the accompanying drawings shall be interpreted as illustrative, and not in a limiting sense. The appended claims are intended to cover all of the generic and specific features of the invention described above.

In the embodiments described above, the absorption cell has been shown and described as being positioned between a light source and the entrance slit. However this is not necessary. It is equally possible to dispose the absorption cell between the exit slit and the photo-electric detection means or multiplier.

What is claimed is:

1. An apparatus for spectroscopic measurement of a concentration of a first substance which is present in a gas together with at least a second substance, said second substance having a characteristic absorption spectrum with a periodic spectrum structure and said first substance having a characteristic absorption spectrum which varies in a more gradual manner with respect to wavelength than does said characteristic absorption spectrum of said second substance, said apparatus comprising: a light absorption cell for containing said gas incorporating said first and second substances;

a source of light, arranged to illuminate a portion of said light absorption cell;

an entrance slit plate having an entrance slit formed therein, said entrance slit being disposed such that a portion of light from said light source passes therethrough after having passed through said light absorption cell, said entrance slit having a slit width which is no greater than one half of the period of said periodic structure of said characteristic absorption spectrum of said second substance;

optical dispersion means disposed to resolve said light passed through said entrance slit into the spectra of said first and second substances;

an exit slit plate having a first exit slit formed therein, said first exit slit being disposed with respect to said optical dispersion means such that light of said resolved spectra which is within a predetermined range of wavelengths passes therethrough, said first exit slit having a slit width which is greater than one half of said period of said periodic structure of said second substance, and such that said first exit slit in conjunction with said entrance slit provide a trapezoidal slit function having a full-width which is within a range extending from a value substantially equal to said period of said periodic structure to a value which is one and one-half times said period of said periodic structure;

wavelength modulation means for modulating the wavelength of light passed through said first exit slit in a periodic manner at a predetermined modulation frequency, with the peak-to-peak amplitude of said wavelength modulation being substantially equal to a value which is $5/\pi$ times said period of said periodic structure;

photo-electric detection means disposed to be illuminated by said light passed through said first exit slit, and responsive to variations in the intensity thereof due to said modulation for producing a light intensity-modulated electrical signal;

signal processing circuit means comprising frequency-selective amplifier circuit means for selectively amplifying a component of said light intensity-modulated electrical signal corresponding to the second derivative of variation of said spectrum of said first substance with respect to wavelength, said second derivative signal component having a frequency of twice said modulation frequency, said frequency-selective amplifier circuit means being responsive to said second derivative signal component for producing an output signal having an amplitude value which is indicative of the concentration of said first substance in said gas; and display means responsive to said output signal from said frequency-selective amplifier circuit means for providing an indication of said concentration of said first substance.

2. An apparatus according to claim 1, and further comprising means for continuously passing said gas including said first and second substances through said light absorption cell.

3. An apparatus according to claim 1, in which said wavelength modulation means comprises means for periodically vibrating said exit slit plate.

4. An apparatus according to claim 3, in which said means for periodically vibrating said exit slit plate comprises a tuning fork having said exit slit plate affixed to a free end of an arm thereof, and means for continuously driving said tuning fork to vibrate at a resonant frequency of vibration thereof.

5. An apparatus according to claim 1, in which said signal processing circuit means further comprises circuit means for generating a signal indicative of an average intensity of light incident on said photoelectric detection means, and circuit means for dividing said output signal from said frequency-selective amplifier circuit means by said average light intensity indicating signal, for thereby providing a signal having an amplitude indicative of said concentration of said first substance which is independent of variations in said average intensity of incident light.

6. An apparatus according to claim 5, in which said signal processing circuit means further comprises means for generating a signal of fixed level which corresponds to a predicted level of interference in spectrometric measurement of said first substance concentration resulting from said second substance, and circuit means for subtracting said fixed level signal from said output signal of said dividing circuit means.

7. An apparatus according to claim 5, in which said signal processing circuit means further comprise means for measuring a concentration of said second substance in said gas and for producing an output signal indicative of a current value a level of interference in spectrometric measurement of said first substance estimated to result from said concentration of said second substance, and circuit means for subtracting said interference level indicating output signal from said output signal of said dividing circuit means.

8. An apparatus according to claim 7, in which said means for producing an output signal indicative of said current value of interference level comprise:

a second exit slit plate having a second exit slit formed therein;

means for directing a portion of light of said resolved spectra from said optical dispersion means through said second exit slit;

second wavelength modulation means for modulating the wavelength of light passed through said second exit slit in a periodic manner at a predetermined modulation frequency and with a predetermined modulation amplitude;

second photo-electric detection means disposed to be illuminated by said light passed through said second exit slit and responsive to variations in the intensity thereof due to said modulation for producing a second light intensity-modulated electrical signal;

second signal processing circuit means comprising frequency-selective amplifier circuit means for selectively modulating a component of said second light intensity-modulated electrical signal corresponding to the second derivative of variation of said spectrum of said second substance with respect to wavelength, said second derivative signal component having a frequency which is twice said modulation frequency of said second wavelength modulation means, said second frequency-selective amplifier circuit means being responsive to said second derivative signal component for producing an output signal having an amplitude value which is indicative of the concentration of said second substance in said gas;

memory circuit means for storing data indicative of a relationship between said concentration of said second substance and said level of interference caused by said second substance;

interference compensating signal generating circuit means responsive to said output signal from said second signal processing circuit means in conjunction with said data stored in said memory circuit means for producing said output signal having an amplitude indicative of a current value of said level of interference.

9. An apparatus according to claim 1, in which said wavelength modulation means further produces a synchronizing signal having a frequency which is an integral multiple of said modulation frequency, and in which said frequency-selective amplifier circuit means comprises a synchronous amplifier circuit which is responsive to said synchronizing signal for selectively amplifying said second derivative signal component of said intensity-modulated light signal.

10. An apparatus according to claim 1, and further comprising heater means for maintaining the temperature of said gas in said light absorption cell at a predetermined value.

11. An apparatus according to claim 1, in which said optical dispersion means comprises a diffraction grating held in a fixed position, and in which said exit slit is adjustably mounted for enabling adjustment of said range of wavelengths of light passed through said first exit slit by adjustment of the position of said first exit slit.

12. An apparatus according to claim 11, in which said exit plate further comprises a second exit slit, and with a spacing being provided between said first and second exit slits which is equal to a difference in wavelength between a central wavelength of said range of wavelengths of light passed through said first exit slit and the wavelength of an emission line of a predetermined substance.

13. An apparatus according to claim 12, in which said predetermined substance comprises mercury.

14. An apparatus according to claim 1, in which said first and second substances comprise ammonia and sulfur dioxide respectively, and in which the width of said entrance slit is substantially no greater than 1 nanometer in terms of wavelength and the width of said first exit slit is substantially greater than 1 nanometer in terms of wavelength, and in which the amplitude of said wavelength modulation is substantially equal to 3.2 nanometers peak-to-peak, expressed in terms of wavelength, and further wherein the central wavelength of said range of wavelengths of light passed through said first exit slit is substantially equal to 209 nanometers.

15. An apparatus according to claim 1, in which said first substance is a member of a group of substances which include iodine and chlorine, and in which said second substance comprises nitrogen dioxide, and further in which said center wavelength of said range of wavelengths of light passed through said first exit slit is within the range of 400 nanometers to 500 nanometers.

16. An apparatus according to claim 1, in which said first substance comprises ozone, and in which said second substance comprises sulfur dioxide, and in which the center wavelength of said range of wavelengths of light passed through said first exit slit is substantially equal to 260 nanometers.

17. An apparatus for continuous spectroscopic measurement of the concentration of ammonia in a gas comprising a mixture of at least ammonia, sulfur dioxide and nitric oxide, said apparatus comprising, in combination:
probe means for continuous sampling of said gas;
a light absorption cell;
pump means for continuously passing said gas from said probe means through said light absorption cell;
a source of light, arranged to illuminate a portion of said light absorption cell;
an entrance slit plate having an entrance slit formed therein, said entrance slit being disposed such that a portion of light from said light source passes therethrough after having passed through said light absorption cell, and said entrance slit having a slit width which is substantially no greater than 1 nanometer in terms of wavelength;
a diffraction grating;
collimating means arranged to direct light passed through said entrance slit onto said diffraction grating;
an exit slit plate having first and second exit slits formed therein, said first exit slit having a slit width which is substantially greater than 1 nanometer in terms of wavelength and said first and second exit slits being spaced apart by a distance substantially equal to 44.7 nanometers, said first exit slit being positioned with respect to said diffraction grating such that light of the absorption spectra of constituents of said gas having a wavelength substantially equal to 209 nanometers passes therethrough;
drive means for vibrating said exit slit plate with a peak-to-peak amplitude of vibration substantially equal to 3.2 nanometers in terms of wavelength and for producing a synchronizing signal at the frequency of said vibration;
a photomultiplier tube arranged to separately detect light passed through said first and second exit slits and responsive to variations in the intensity of light from said first exit slit for producing a light intensity modulation signal;
a frequency-quadrupling circuit responsive to said synchronizing signal for producing a signal having four times the frequency of said synchronizing signal;
a synchronous amplifier circuit coupled to receive an alternating current component of said light intensity-modulated electrical signal and controlled by said output signal from said frequency quadrupler circuit for selectively amplifying a part of said alternating current component having a frequency of twice said modulation frequency;
a direct current amplifier circuit for amplifying a direct current component of said light intensity-modulated electrical signal;
a divider circuit for dividing an output signal from said synchronous amplifier circuit by an output signal from said direct current amplifier circuit;
a voltage generating device for producing a fixed voltage having a value corresponding to an anticipated level of spectroscopic measurement interference resulting from said sulfur dioxide;
a subtraction circuit for subtracting said fixed voltage from an output signal voltage produced by said divider circuit, for thereby producing an output signal voltage indicative of the concentration of ammonia in said sampled gas; and
display means responsive to said output signal from said subtraction circuit for indicating said concentration of ammonia gas.

18. An apparatus for continuous spectroscopic measurement of the concentration of ammonia in a gas comprising a mixture of at least ammonia, sulfur dioxide, and nitric oxide, said apparatus comprising, in combination:
a light absorption cell;
means for continuously passing said gas through said light absorption cell;

a source of light, arranged to illuminate a portion of said light absorption cell;

an entrance slit plate having an entrance slit formed therein, said entrance slit being disposed such that a portion of light from said light source passes through said entrance slit after having passed through said light absorption cell, said entrance slit having a slit width substantially no greater than 1 nanometer in terms of wavelength;

a diffraction grating;

collimating means arranged to direct light passed through said entrance slit onto said diffraction grating;

a first exit slit plate having an exit slit formed therein, said exit slit having a slit width which is substantially greater than 1 nanometer in terms of wavelength and being positioned with respect to said diffraction such that light of absorption spectra of said gas having a wavelength substantially equal to 209 nanometers passes through said exit slit;

drive means for vibrating said first exit slit plate with a peak-to-peak amplitude of vibration substantially equal to 3.2 nanometers in terms of wavelength and for producing a synchronizing signal at the frequency of said vibration;

a mirror arranged to reflect a portion of light from said diffraction grating;

a second exit slit plate having an exit slit formed therein, said exit slit having a slit width with a wavelength equivalent value substantially equal to 0.6 nanometers;

drive means for vibrating said second exit slit plate with an amplitude of vibration such as to produce a peak-to-peak amplitude of wavelength modulation of light passed through said exit slit of said second exit slit plate which is substantially equal to 1.8 nanometers;

first photomultiplier tube arranged to detect light passed through said exit slit in said first exit slit plate, and responsive to variations in intensity of light passed therethrough for producing a first light intensity modulation signal;

a first signal processing circuit responsive to said first light intensity modulation signal for producing an output signal indicative of the concentration of ammonia in said gas;

a second photomultiplier tube arranged to detect light passed through said exit slit in said second slit plate, and responsive to variations in the intensity of light passed therethrough for producing a second light intensity modulation signal;

a second signal processing circuit responsive to said second light intensity modulation signal for producing an output signal indicative of the concentration of sulfur dioxide in said gas;

a memory device for storing data indicative of a relationship between the concentration of said sulfur dioxide in said gas and a level of interference with spectrometric measurement of said ammonia;

an interference compensation signal generating circuit responsive to said output signal from said second signal processing circuit in conjunction with said data stored in said memory device for producing an output signal having an amplitude indicative of a current level of said interference;

a subtraction circuit for subtracting said interference level indicating signal from said output signal of said first signal processing circuit to thereby produce an output signal to accurately indicate the concentration of ammonia in said gas; and a display device for providing an indication of said ammonia concentration in response to said subtraction circuit output signal.

19. An apparatus for spectroscopic measurement of a concentration of a first substance which is present in the atmosphere together with at least a second substance, said second substance having a characteristic absorption spectrum with a periodic spectrum structure and said first substance having a characteristic absorption spectrum which varies in a more gradual manner with respect to wavelength than does said characteristic absorption spectrum of said second substance, said apparatus being disposed such that light from the sun is incident thereon after passing through the atmosphere, said apparatus comprising:

an entrance slit plate having an entrance slit formed therein, said entrance slit being disposed such that a portion of said incident light passes therethrough, said entrance slit having a slit width which is no greater than one half of the period of said periodic structure of said characteristic absorption spectrum of said second substance;

optical dispersion means disposed to resolve said light passed through said entrance slit into the spectra of said first and second substances;

an exit slit plate having a first exit slit formed therein, said first exit slit being disposed with respect to said optical dispersion means such that light of said resolved spectra which is within a predetermined range of wavelengths passes therethrough, said first exit slit having a slit width which is greater than one half of said period of said periodic structure of said second substance, and such that said first exit slit in conjunction with said entrance slit provide a trapezoidal slit function having a full-width which is within a range extending from a value substantially equal to said period of said periodic structure to a value which is one and one-half times said period of said periodic structure;

wavelength modulation means for modulating the wavelength of light passed through said first exit slit in a periodic manner at a predetermined modulation frequency, with the peak-to-peak amplitude of said wavelength modulation being substantially equal to a value which is $5/\pi$ times said period of said periodic structure;

photo-electric detection means disposed to be illuminated by said light passed through said first exit slit, and responsive to variations in the intensity thereof due to said modulation for producing a light intensity-modulated electrical signal;

signal processing circuit means comprising frequency-selective amplifier circuit means for selectively amplifying a component of said light intensity-modulated electrical signal corresponding to the second derivative of variation of said spectrum of said first substance with respect to wavelength, said second derivative signal component having a frequency of twice said modulation frequency, said frequency-selective amplifier circuit means being responsive to said second derivative signal component for producing an output signal having an amplitude value which is indicative of the concentration of said first substance in said gas; and display means responsive to said output signal from said frequency-selective amplifier circuit means for providing an indication of said concentration of said first substance.

20. An apparatus for spectroscopic measurement of a concentration of a first substance which is present in a gas together with at least a second substance, said second substance having a characteristic absorption spectrum with a periodic spectrum structure and said first substance having a characteristic absorption spectrum which varies in a more gradual manner with respect to wavelength than does said characteristic absorption spectrum of said second substance, said apparatus comprising:

a source of light;

an entrance slit plate having an entrance slit formed therein, said entrance slit being disposed such that a portion of light from said light source passes therethrough, said entrance slit having a slit width which is no greater than one half of the period of said periodic structure of said characteristic absorption spectrum of said second substance;

optical dispersion means disposed to resolve said light passed through said entrance slit into the spectra of said first and second substances;

an exit slit plate having a first exit slit formed therein, said first exit slit being disposed with respect to said optical dispersion means such that light of said resolved spectra which is within a predetermined range of wavelengths passes therethrough, said first exit slit having a slit width which is greater than one half of said period of said periodic structure of said second substance, and such that said first exit slit in conjunction with said entrance slit provide a trapezoidal slit function having a full-width which is within a range extending from a value substantially equal to said period of said periodic structure to a value which is one and one-half times said period of said periodic structure;

wavelength modulation means for modulating the wavelength of light passed through said first exit slit in a periodic manner at a predetermined modulation frequency, with the peak-to-peak amplitude of said wavelength modulation being substantially equal to a value which is $5/\pi$ times said period of said periodic structure;

light absorption cell for containing said gas incorporating said first and second substances, and disposed such that light from said exit slit passes therethrough;

photo-electric detection means disposed to be illuminated by said light passed through said light absorption cell, and responsive to variations in the intensity thereof due to said modulation for producing a light intensity-modulated electrical signal;

signal processing circuit means comprising frequency-selective amplifier circuit means for selectively amplifying a component of said light intensity-modulated electrical signal corresponding to the second derivative of variation of said spectrum of said first substance with respect to wavelength, said second derivative signal component having a frequency of twice said modulation frequency, said frequency-selective amplifier circuit means being responsive to said second derivative signal component for producing an output signal having an amplitude value which is indicative of the concentration of said first substance in said gas; and display means responsive to said output signal from said frequency-selective amplifier circuit means for providing an indication of said concentration of said first substance.

* * * * *